United States Patent [19]
Beck et al.

[11] 3,777,133
[45] Dec. 4, 1973

[54] CROSS CORRELATOR

[76] Inventors: Maurice Sidney Beck, 10 Hazelhurst Rd., Bradford 9, Yorkshire; Gerald Musgrave, 3 Langley Ln., Tong Park, Baildon, Yorkshire; Colin Norman Wormald, 109 Healey Ln., Batley, Yorkshire, England

[22] Filed: Jan. 24, 1972

[21] Appl. No.: 220,017

[30] Foreign Application Priority Data
   Jan. 26, 1971  Great Britain.................... 3,193/71

[52] U.S. Cl........... 235/181, 235/151.34, 324/77 H, 343/100 CL
[51] Int. Cl........................... G06g 7/19, G06f 15/34
[58] Field of Search....................... 235/181, 151.34; 343/100 CL, 112 R, 112 D; 324/77 G, 77 H

[56] References Cited
UNITED STATES PATENTS

| | | | |
|---|---|---|---|
| 3,036,775 | 5/1962 | McDermid et al............. | 235/181 X |
| 3,532,867 | 10/1970 | Ricketts et al..................... | 235/181 |
| 3,376,411 | 4/1968 | Montani et al. ................ | 235/181 X |
| 3,249,911 | 5/1966 | Gustafsson..................... | 235/181 X |
| 3,167,738 | 1/1965 | Westerfield........................ | 235/181 |
| 3,185,958 | 5/1965 | Masterson et al. ............. | 235/181 X |
| 3,463,911 | 8/1969 | Dupraz et al. ...................... | 235/181 |

*Primary Examiner*—Felix D. Gruber
*Attorney*—Irvin S. Thompson et al.

[57] ABSTRACT

Apparatus for cross-correlating a pair of electrical signals in which each signal is converted into a binary signal and fed to a feedback shift register. One of the registers has a delay in its feedback path. When the registers are full, the shift registers are continuously recycled and their outputs continuously compared by an exclusive - NOR gate. A counter coupled to the exclusive - NOR gate counts the number of coincidences in a single cycle of the contents of the shift registers. This count is compared with the highest count attained in a previous cycle, the new count being held in a count store if higher than the previous highest count. The time between the start of the comparison and the time at which the highest count is obtained is stored in a separate time store. After each cycle the delay between the signals increases by one clock pulse. The time store then gives the delay for maximum correlation. In a further embodiment the invention operates with signals having three or more discrete levels in place of binary signals.

6 Claims, 3 Drawing Figures

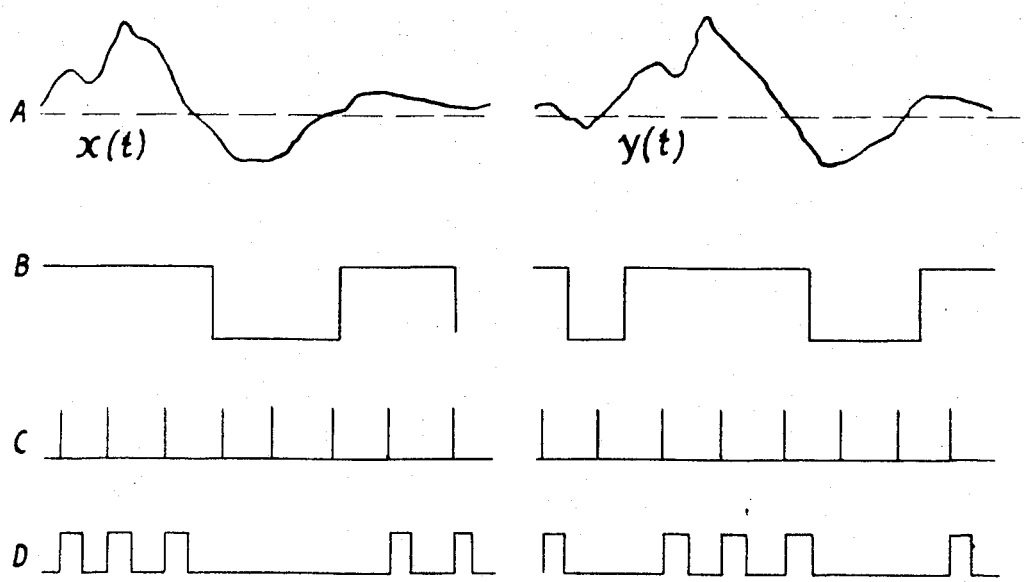

CROSS CORRELATOR

FIELD AND SUMMARY OF THE INVENTION

This invention relates to apparatus for cross correlating electrical signals.

It is known to measure fluid flow velocity by cross correlating signals representative of the flow and obtained from positions spaced apart in the direction of flow. A particular application of a preferred embodiment of the present invention described below is to cross correlate the electrical outputs of transducers arranged to detect such signals to provide a measure of the fluid flow velocity by determining the time delay between the two signals for maximum correlation. The mean fluid flow velocity is equal to the spacing between the two positions divided by such time delay. It will be appreciated, however, that the invention is not limited to apparatus for use in this application, but includes apparatus for cross correlating electrical signals from any sources. For instance, apparatus embodying the invention can also be used to cross correlate transmitted and return signals in wave energy position finding systems such as radar or sonar to determine the time delay therebetween.

According to the present invention, apparatus for cross correlating a pair of electrical signals comprises shift registers associated with respective signals and each adapted to store a series of signal elements, the signal elements in each series representing the magnitude of the associated signal at succeeding instants in time, respectively, comparator means for comparing the signal element at the output stage of one shift register with the signal element at the output stage of the other shift register and producing an output signal representing correspondence between the two elements, accumulator means for accumulating output signals from the comparator means, control means for supplying shift pulses to each shift register so that each element in the register is advanced to the succeeding stage therein, feedback means for each shift register, each feedback means coupling the output stage of the associated register to the input stage thereof, one of the feedback means including a delay, whereby the application of a number of shift pulses corresonding to the number of stages in each register causes a cycle of operation in which the elements stored in one shift register are returned to their original stages in the register and the elements in the other shift register are displaced by at least one stage relative to their original stages, the control means supplying shift pulses to cause a series of succeeding cycles of operation resulting in a progressively increasing displacement of the elements in one register relative to the elements in the other register, and the accumulator means providing, for each cycle of operation, a signal representative of the number of output signals from the comparator means, and hence the degree of cross-correlation between the two electrical signals for a time delay corresponding to that cycle.

Clearly, the time delay between the pair of signals associated with the cycle producing the maximum total signal is the time delay between the signals producing maximum cross correlation. In order that the maximum total signal may be determined automatically, the apparatus is preferably provided with a first store connected to the accumulation means for storing said total signal, a comparator connected to the first store and the accumulation means for indicating when the total signal of the accumulation means is greater than the total signal preserved in the first store, first means responsive to such indication being present at the end of a cycle to cause the total signal of the accumulation means to be entered into the first store in place of the total signal preserved therein, and second means responsive to such indication being present at the end of a cycle to record the time delay between said pair of signals for such cycle. Preferably said second means comprises a counter connected to count the number of cycles and a second store, and is responsive to said indication to enter the cycle number in the counter into the second store. The cycle number is proportional to the time delay between the pair of signals. It will be seen that once the required number of cycles have taken place, the maximum total signal occurring among all the cycles will be preserved in the first store and the number of the associated cycle will be preserved in the second store. This cycle number is thus indicative of the time delay between the two signals producing maximum correlation.

The apparatus may also include means for displaying the maximum total signal and/or the associated time delay, or further information computed therefrom, e.g. fluid flow velocity in the above-mentioned preferred application. Further, the apparatus may have means for recording and/or displaying the total signal in the accumulation means at the end of each cycle so as to record and/or display the cross correlation function of the pair of signals.

In a preferred embodiment of the invention the apparatus compares the amplitude values of successive elements of the pair of signals, which are in binary form, and the multiplier means is then desirably a coincidence detector, i.e. a form of binary signal multiplier. This apparatus may include means for digitizing analogue input signals, such means not being necessary if the signals are supplied to the apparatus in digital form. The digitizing means may in part comprise, for each signal, a respective polarity detector which produces a binary digital output signal, the level of which is determined by the polarity of the analogue input singal. The binary signals so-formed are digitized by being clocked into shift registers comprising said storage means. It is contemplated, however, that binary signals produced by other techniques, or digital signals having more than two levels, may be used instead.

BRIEF DESCRIPTION OF THE DRAWINGS

The invention may be more readily understood from the following description of two preferred embodiments thereof, given by way of example only, having reference to the accompanying drawings, in which:

FIG. 3 shows a number of waveforms present during operation at different points in the circuit of FIG. 2.

DESCRIPTION OF THE PREFERRED EMBODIMENTS

Figure 1:
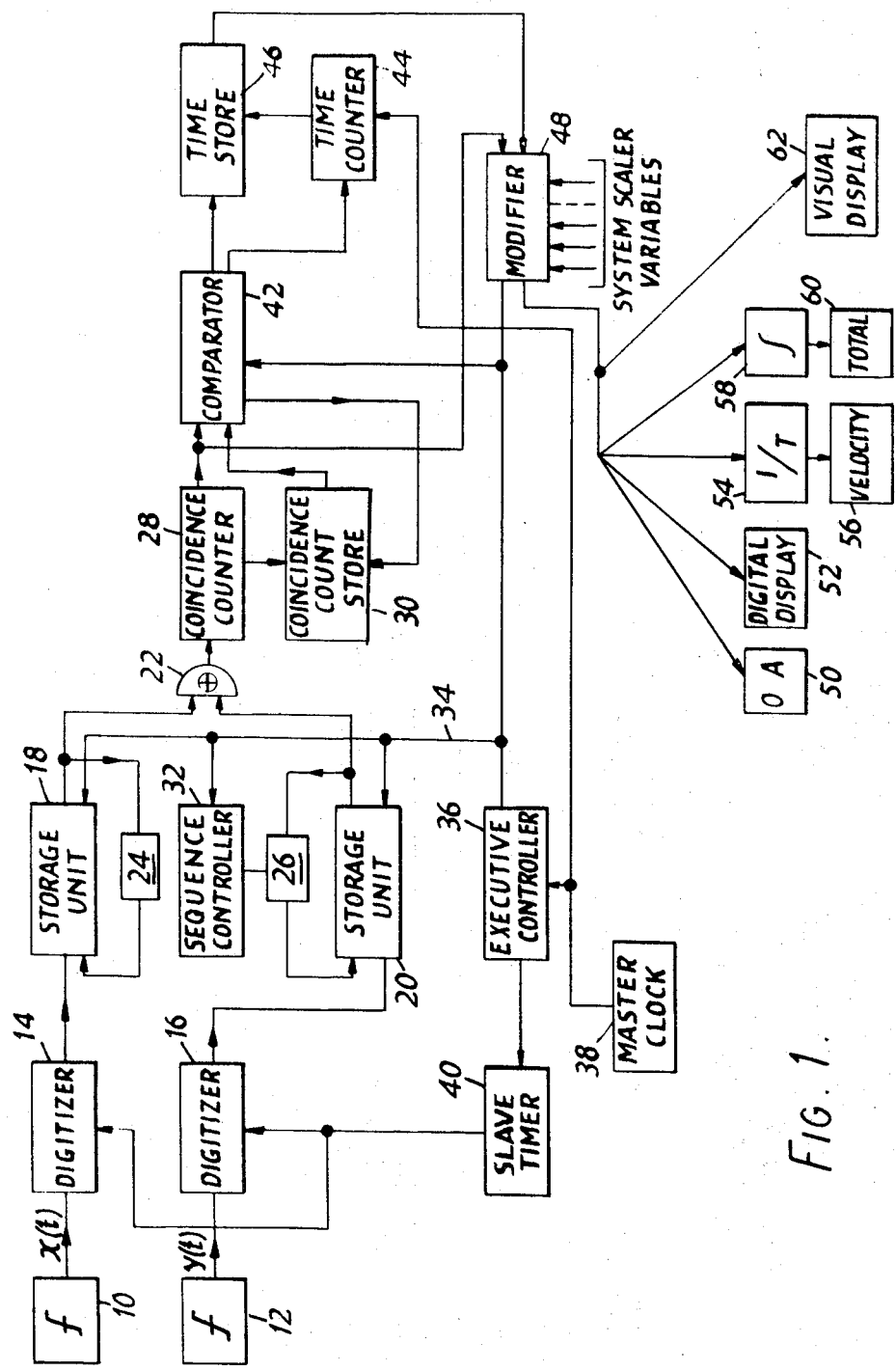
FIG. 1 is a schematic view of a cross correlator in block diagram form.

FIG. 1 shows in block diagram form an apparatus used to determine fluid flow velocity by cross correlating the electrical outputs of two transducers 10, 12 responsive to fluid flow and spaced apart in the direction of flow. The apparatus is arranged to determine that value of time delay between the two signals which produces maximum cross correlation and thereby to determine the mean fluid flow velocity. The two electrical output signals from transducers 10 and 12, x(t) and y(t) respectively, are applied to respective digitizers 14 and 16. The outputs of the digitizers 14 and 16 are connected to storage means comprising respective storage units 18 and 20. The outputs of the storage units 18 and 20 are each connected to a respective input of an exclusive-OR coincidence detection gate 22 arranged to produce an output when the signals at the inputs thereof coincide. The outputs of the storage units 18 and 20 are also connected by respective feedback circuits 24 and 26 to their respective inputs. The feedback circuit 26 includes a delay element and is controlled by a sequence controller 32. The storage units 18, 20, and the sequence controller 32 are supplied with clock pulses over a conductor 34 from an executive controller 36. The clock pulses supplied by the executive controller 36 are derived from a master clock oscillator 38. The executive controller 36 includes a frequency divider producing an output applied to a slave timer 40 which is arranged to supply low frequency clock pulses to the digitizers 14 and 16.

Output signals from the coincidence detector 22 which indicate coincidence of the storage units 18 and 20 are passed to and counted by a coincidence counter 28. The count stored in the counter 28 is monitored by a comparator 42, which also monitors the count stored in a coincidence count store 30. The comparator 42 is arranged to transfer the total count in the counter 82 at the end of a cycle into the store 30 when it exceeds the count preserved in the store 30. A time counter 44 counts the number of cycles taking place. Whenever the comparator 42 causes the coincidence count in the counter 28 to be transferred to the coincidence count store 30 it also causes the time count in the counter 44 to be transferred to the time store 46. The contents of the coincidence counter 28 or the contents of the time store 46, or both are passed to a modifier unit 48 when all the cycles have been completed where they are processed according to system scalar variables. These variables may be representative of such factors as pipe diameter and flow rate range appropriate to a particular application. The comparator 42 and the modifier 48 are also supplied with clock pulses from the executive controller 36.

The output of the modifier which constitutes the output of the apparatus may be fed to one or more of a number of alternative read-out devices. These may comprise an analogue read-out unit 50, a digital display unit 52, a unit 54 which divides the spacing between the two transducers by the delay for maximum cross correlation determined by the apparatus to provide a visual display of the fluid flow velocity at 56, an integrator 58 which displays the total fluid flow throughout visually at 60, and a visual display 62. The visual display unit 62 may comprise a storage oscilloscope which is supplied at the end of each cycle by the modifier 48 through appropriate conventional means (not shown) with an analogue voltage proportional to the coincidence count of that cycle. Each such voltage will thus provide a bright point on the oscilloscope, and, once all the cycles have been completed, the points will define a curve indicating the cross correlation function of the two signals x(t) and y(t).

The digital display device 52 may be of the type which displays a time delay computed in one operation until a fresh time delay computed in the next operation is ready.

The manner of operation of the apparatus is as follows. The digital signals from the outputs of the digitizers 14 and 16, which are generated at a frequency determined by the low frequency clock pulses from the slave timer 40, are fed serially into the storage units 18 and 20. The frequency of the clock pulses supplied from the slave timer 40 for this purpose is chosen in accordance with the transducer time constants. The capacities of the storage units 18 and 20 may be varied to suit particular applications and in this preferred embodiment they are each one thousand bits. Once the storage units have been filled with the digitized signal elements, the executive controller 36 inhibits the digitizing operations, which take place at the relatively low clock frequency, and starts the process of determining the delay for maximum correlation, which takes place at the relatively high clock frequency, i.e. of the order of computing speeds. In this process successive elements of the digitized signals stored in the storage units 18 and 20 are sequentially applied together to the coincidence detector 22. They are also successively fed back via the feedback circuits 24 and 26 to their respective inputs whereby when each element has been so fed back the elements stored in the storage units are preserved in the same form as they were before the process commenced. However, the delay element in the feedback circuit 26 delays the feedback to the storage unit 20 so that at the end of the cycle whereas the elements in the storage unit 18 are in the same positions as they were at the start of the cycle, those in the unit 20 are displaced by a single element spacing.

The number of output signals from the coincidence detector 22 indicative of a coincidence occurring between the elements stored in the units 18 and 20 during one cycle is accumulated in the coincidence/counter 28. This count value is then compared with the count value preserved in the store 30 and, if it exceeds said stored value, it is entered into the store 30 in place of said stored value. The counter 28 is then cleared. If the coincidence count is transferred into the store 30, the time count (i.e. the cycle number) in the time counter 44 is transferred into the time store 46. The whole comparison and feedback cycle is then repeated, but due to the elements stored in the storage unit 20 being displaced by one element spacing, the elements of one stored signal are compared with later elements of the other stored signal as compared to the previous cycle. The number of coincidences recorded in the counter 28 is again compared by the comparator 42 with the count accumulated in the store 30 and the two stores 30 and 46 are again updated if the number of coincidences occurring during the cycle is greater than the greatest number occurring during any previous cycle as recorded in the coincidence count store 30.

The coincidence detection cycle is successively repeated until the two sets of signal elements have been compared for all possible relative delays, i.e., when the elements are displaced by one element spacing per cycle, until the number of cycles equals the number of elements of each signal stored. The count then stored in coincidence count store 30 is the maximum cycle count occurring and during the associated cycle there was thus maximum cross correlation between the two signals x(t) and y(t). The associated cycle number is preserved in the time store 46 and is fed into the modifier 48. The delay corresponding to such preserved cycle number may be calculated by the modifier 48 to assist in providing one of the displays at the unit 50, 52, 56, 60 or 62 as discussed above.

It will be appreciated that the process for determining the maximum correlation may be speeded up, with a corresponding loss in accuracy, by displacing the elements in the storage unit 20 by two or more element spacings, rather than by one, between each coincidence detection cycle. Alternatively, the process may be speeded up without loss in accuracy by making the cycle delay variable. For instance, if it is known that the maximum cross correlation between the two signals will occur when they are relatively displaced by approximately 150 element spacings, the delay can be set by known methods to 120 spacings for the first cycle, and thereafter to unity as above. Operating in this manner eliminates 120 low correlation cycles and thus speeds up the whole process. The delay could then be increased again at say 200 spacings after the correlation peak has clearly occurred, to further speed up the operation.

Figure 2:
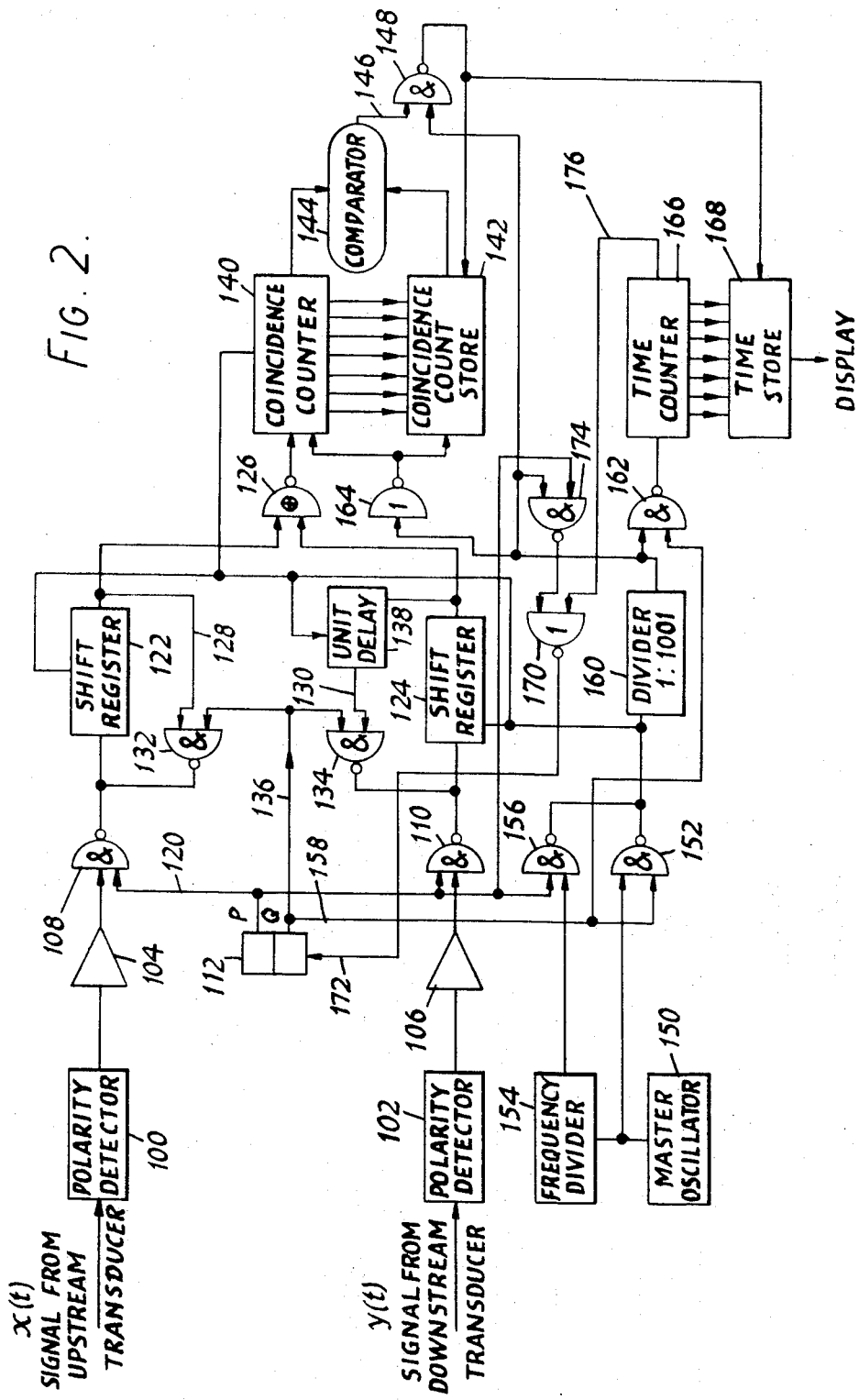
FIG. 2 is a circuit diagram of a cross correlator which is similar to that shown in block diagram form in FIG. 1.

FIG. 2 is a circuit diagram of a cross correlator which is similar to that shown in block diagram form in FIG. 1. The two analogue electrical signal outputs from the transducers (not shown) are applied to respective polarity detectors 100 and 102. These detectors produce binary signal outputs, the levels of which are determined by the polarities of the inputs, which are amplified by respective amplifiers 104 and 106 and passed to respective NAND gates 108 and 110 which are enabled by a common signal on a conductor 120. The outputs of the NAND gates 108, 110 are connected to storage units which comprise shift registers 122 and 124. The outputs of the shift registers are each applied to a respective input of a coincidence detection gate 126 and are fed back to their inputs in similar manner to FIG. 1 via feedback loops 128 and 130. The feedback loops 128 and 130 are controlled by respective NAND gates 132 and 134 which are enabled by a common input on the conductor 136. The feedback loop 130 also includes a unit delay device 138.

A bistable device 112 having complementary outputs P AND Q supplies said enabling signals on the conductor 120 or the conductor 136 when the apparatus is in the read-in or the cycling mode respectively.

In like manner to FIG. 1, the output from the coincidence detection gate 126 is passed to a coincidence counter 140. The counter 140 is arranged, on receipt of an appropriate instruction, to transfer its contents in parallel to a coincidence count store 142. The contents of the counter 140 and of the store 142 are connected to be compared by a comparator 144 which is arranged to produce an output signal on an output conductor 146 when the contents of the store are greater than the contents of the counter. Such signal is applied as one input to a further NAND gate 148.

The apparatus is provided with a master clock oscillator 150 which supplies an output directly to a NAND gate 152 to provide the high frequency clock pulses and by means of a frequency divider 154 to another NAND gate 156, to provide the low frequency clock pulses. The other inputs to the NAND gates 152 and 156 are provided, respectively, by said enabling signals from the bistable device 112 on a conductor 158 and on the conductor 120. The outputs of the gates 152 and 156 are connected together so as to supply either low or high frequency clock pulses, according to whether the apparatus is in the read-in or the cycling mode, to the shift registers 122 and 124, the coincidence counter 140 and to a 1001:1 frequency divider 160. The output of the divider is connected to one input of each of two further NAND gates 162 and 174, the NAND gate 148, and to an input of a NOR gate 164. It is also connected by way of gate 164 to the coincidence counter 140 and to the coincidence count store 142. The other input to the NAND gate 162 is provided by the conductor 158, and the output of the gate 162 is connected to the input of a time counter 166 which counts the number of elapsed cycles. The counter 166 is arranged to transfer its contents to a further store 168 when enabled by a signal from the output of the NAND gate 148. The contents of the store 168 may be passed via a modifier, if required, to a display (not shown) when cycling has finished, as described above with reference to FIG. 1.

When the counter 166 is full it applies a signal as one input to a NOR gate 170. The other input of the gate 170 is obtained from the output of said NAND gate 174. The output from the gate 170 is connected via a conductor 172 to a toggling input of the bistable device 112.

The manner in which the apparatus determines the value of the delay between the two signals x(t) and y(t) which produces maximum cross correlation is described below. It is assumed that initially the bistable device 112 is in the state in which output P is active. Consequently, gates 108, 110, 156 and 174 are enabled, and gates 132, 134, 152 are 162 are disabled.

The signals from the transducers applied to the inputs of the polarity detectors 100 and 102, as shown in FIG. 3 at A produce binary signals as shown in FIG. 3 at B which signals are amplified by the amplifiers 104 and 106 and passed via the NAND gates 108 and 110 to the shift registers 122 and 124. As gate 156 is enabled and gate 152 is disabled, low frequency clock pulses as shown in FIG. 3 at C are supplied to the shift registers 122 and 124, and the signals B are thus clocked into the shift registers and digitized as shown in FIG. 3 at D, the corresponding binary values being shown at E. Ten bits only of the signals D and E are shown in FIG. 3 for convenience. It will be appreciated that in practice 1,000 bits are fed into the shift registers 122 and 124 in this manner.

Meanwhile, as the shift registers are being filled, the low frequency clock pulses are also being fed into the divider 160. When the registers are full, i.e. when 1,000 bits are fed into each, one bit later the divider 160 provides an output indicating this. This output is passed via gates 174 and 170 to the conductor 172 thus toggling the bistable device 112 and putting the apparatus into the cycling or compute mode. This output also clears the counter 140 via the inverter 164.

Once the bistable device 112 changes state, the gates 108, 110, 156 and 174 are disabled, and the gates 132, 134, 152 and 162 are enabled. Consequently, high frequency clock pulses are sent out in place of low frequency pulses, the gates 108 and 110 stop reading-in of the signals, and the feedback loops 128 and 130 are closed. The repetitive feedback and coincidence detection cycling then takes place, at a much faster frequency than the speed at which the bits were clocked into the shift registers. The operation proceeds much in the same manner as described above with reference to FIG. 1. Each bit or element stored in the shift registers 122 and 124 is sequentially passed to the coincidence detection gate 126 and is fed back round the feedback loops 128 and 130 to its respective input. Due to the provision of the unit delay element 138, after each operation, the elements stored in the shift register 124 are displaced by a further bit period, and thus in each cycle the comparison between the two series of elements is staggered by one further element.

The comparison between the two sets of stored elements for three successive cycles is illustrated by way of example for 10 bits only in FIG. 3 at F, G, H and I. At F, the two sets of bits shown at E are shown together as they are compared. At G, H and I the bits obtained from the signal y(t) are shown displaced by one, two and three bit spacings respectively with respect to the bits obtained from the signal x(t). It can readily be seen that the number of coincidences for the four cycles, in order, is 4, 6, 7 and 5. Clearly then, the third cycle, shown at H, produces maximum correlation between the two signals.

The manner in which the apparatus of FIG. 2 operates when in the cycing mode will now be described in detail. Once cycling has started, high speed clock pulses are continually fed to the shift registers 122 and 124 and they are operative to continually recycle their contents via the feedback loops 128 and 130, with an extra bit period's delay being added into the feedback loop 130 on each cycle. The coincidence counter 140 counts the number of coincidences in each cycle as detected by the gate 126.

The divider 160, which previously timed the read-in operation, now acts to time the cycles. Thus, once cycling has started, the divider 160 produces an output after 1001 high frequency clock pulses to indicate the end of the first cycle. This output enables the NAND gate 148 so that the output of the comparator 144, which is continually comparing the contents of the counter 140 and store 142, is connected to the coincidence count store 142 and the time store 168. If the comparator output signal as transmitted by the gate 148 indicates that the count preserved in the store 142 is less than the count in the counter 140, the contents of the two counters 140 and 166 are passed to their respective associated stores 142 and 168. In this way, the two stores continually record the coincidence count and the cycle number of the cycle which has had the greatest number of coincidences.

As well as enabling the gate 148, the output from the divider clears the counter 140 via the NOR gate 164, and is passed via the gate 162 to the time counter 166. This counter thus counts the number of cycles which is proportional to the time delay between the two signals x(t) and y(t).

When 1,000 cycles have taken place, i.e. when the full digital cross-correlation function has been computed, the time counter provides an output signal on a conductor 176 which is connected to one input of the NOR gate 170. The output of this gate is then operative to toggle the bistable device 112 so that the apparatus is returned to the low speed read-in mode and the whole process of determining the time delay for maximum cross correlation is then repeated for a new pair of samples of the signals x(t), y(t).

The dual speed operating feature of the apparatus described enables the relatively low frequency digitizing operation to be compatible with the fast computing speeds necessary to provide a quick computation of the delay for maximum correlation.

Various modifications of the apparatus described with reference to FIG. 2 are contemplated. For instance, the operation of the apparatus may be speeded up by continually up-dating the stored elements of signal information instead of renewing the contents of each storage unit after the delay for maximum correlation has been computed.

If required, the embodiment of FIG. 2 may be employed with a multiplexer so that it may process signals from several different sets of transducers on a time division multiplex basis.

The cross correlation operation of the apparatus of FIG. 2 may be speeded up, with or without consequent loss in accuracy, by the same methods, mentioned hereinabove, as can be used for the apparatus of FIG. 1.

The apparatus described provides for fast, on-line computation of the cross correlation between two electrical signals and can be simply and economically fabricated using standard logic units, obviating the need for an expensive digital computer.

As was mentioned before, the present invention may operate with signals having three or more discrete levels rather than, as here, with binary signals. It might, for example, be necessary to use more than two levels to accommodate peculiarities of the input signal waveforms. In apparatus designed to operate on this basis, the shift registers could be replaced by groups of registers and the coincidence detector replaced by a multi-level multiplier circuit which multiplies together successive groups of signal elements from each of the groups of registers to produce a product signal. All the product signals produced in each cycle are added, e.g. by an analog addition circuit, or if the multiplier produces a digital output, by a counter, to produce the total signal for the cycle; and the apparatus determines the cycle in which the greatest total signal is produced in like manner to that described in the above descriptions of specific forms of cross correlation apparatus.

We claim:

1. Apparatus for cross-correlating a pair of electrical signals, comprising shift registers associated with respective signals and each adapted to store a series of signal elements, the signal elements in each series representing the magnitude of the associated signal at succeeding instants in time, respectively, comparator means for comparing the signal element at the output stage of one shift register with the signal element at the output stage of the other shift register and producing an output signal representing correspondence between the two elements, accumulator means for accumulating output signals from the comparator means, control means for supplying shift pulses to each shift register so that each element in the register is advanced to the succeeding stage therein, feedback means for each shift register, each feedback means coupling the output stage of the associated register to the input stage thereof, one of the feedback means including a delay, whereby the application of a number of shift pulses corresponding to the number of stages in each register causes a cycle of operation in which the elements stored in one shift register are returned to their original stages in the register and the elements in the other shift register are displaced by at least one stage relative to their original stages, the control means supplying shift pulses to cause a series of succeeding cycles of operation resulting in a progressively increasing displacement of the elements in one register relative to the elements in the other register, and the accumulator means providing, for each cycle of operation, a signal representative of the number of output signals from the comparator means, and hence the degree of cross-correlation between the two electrical signals for a time delay corresponding to that cycle.

2. Apparatus as defined in claim 1 wherein the control means are adapted to supply shift pulses at a relatively high frequency for the purpose set forth, or to supply shift pulses at a relatively low frequency for clocking said pair of signals into said shift registers prior to the cyclical application of the elements stored therein to said comparator means, and the control means includes means responsive to a predetermined number of elements having been fed into said shift registers to supply shift pulses at said relatively high frequency and means responsive to a predetermined number of cycles having taken place to supply pulses at said relatively low frequency.

3. Apparatus as defined in claim 1, further including a first store connected to said accumulation means for storing said signal; a second comparator connected to said first store and said accumulation means for indicating when the signal of the accumulation means is greater than the signal preserved in the first store; the second comparator including means responsive to such indication at the end of a cycle to cause the signal of said accumulation means to be entered into said first store in place of the total signal preserved therein; and means responsive to such indication being present at the end of a cycle to record the time delay between said pair of signals for such cycle.

4. Apparatus as defined in claim 3 wherein the last-named means comprises a counter connected to count the number of cycles and a second store, and is responsive to said indication to enter the cycle number in said counter into said second store.

5. Apparatus as defined in claim 1, further comprising a respective polarity detector for each of said pair of signals for converting the signals from an analog form into a binary form for supplying to said shift registers.

6. Apparatus as defined in claim 1, further comprising means for converting said pair of signals from an analog form into a form having at least two discrete levels.

* * * * *